United States Patent
Ray et al.

(10) Patent No.: US 9,826,673 B1
(45) Date of Patent: Nov. 28, 2017

(54) SWATH ACQUISITION SYSTEM FOR AN AGRICULTURAL VEHICLE

(71) Applicants: CNH Industrial America LLC, New Holland, PA (US); Autonomous Solutions, Inc., Mendon, UT (US)

(72) Inventors: Brian Robert Ray, Chicago, IL (US); Brett Carson McClelland, Chicago, IL (US); Peter John Dix, Naperville, IL (US); Nathan Eric Bunderson, Providence, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 15/166,622

(22) Filed: May 27, 2016

(51) Int. Cl.
*A01B 69/04* (2006.01)
*G05D 1/00* (2006.01)
*G05D 1/02* (2006.01)
*B60K 35/00* (2006.01)

(52) U.S. Cl.
CPC ............ *A01B 69/008* (2013.01); *B60K 35/00* (2013.01); *G05D 1/0088* (2013.01); *G05D 1/0219* (2013.01); *B60K 2350/1004* (2013.01); *B60K 2350/352* (2013.01)

(58) Field of Classification Search
None
See application file for complete search history.

(56) References Cited

U.S. PATENT DOCUMENTS

| | | | |
|---|---|---|---|
| 5,974,348 A | 10/1999 | Rocks | |
| 6,336,051 B1 * | 1/2002 | Pangels | A01D 41/1278 700/207 |
| 7,437,230 B2 | 10/2008 | McClure et al. | |
| 7,451,030 B2 | 11/2008 | Eglington et al. | |
| 7,689,356 B2 | 3/2010 | Dix et al. | |

(Continued)

FOREIGN PATENT DOCUMENTS

WO  2014105281  7/2014

OTHER PUBLICATIONS

"Satellite Signals Steer Farmers Straight," XYHT.Com, Dec. 10, 2014, http://www.xyht.com/enviroag/satellite-signals-steer-farmers-straight/.

(Continued)

*Primary Examiner* — Krishnan Ramesh
(74) *Attorney, Agent, or Firm* — Rebecca L. Henkel; Rickard K. DeMille (57) ABSTRACT

A method for controlling an agricultural vehicle includes receiving, via a processor, a first signal from a user interface indicative of a value of at least one parameter. The method also includes determining, via the processor, a path of the agricultural vehicle toward a guidance swath based at least in part on the at least one parameter. In addition, the method includes outputting, via the processor, a second signal to a display of the user interface indicative of instructions to present a graphical representation of the path of the agricultural vehicle. Furthermore, the method includes controlling the agricultural vehicle, via the processor, based at least in part on the at least one parameter upon receiving at least a third signal from the user interface indicative of acceptance of the value of the at least one parameter.

20 Claims, 7 Drawing Sheets

(56) References Cited

U.S. PATENT DOCUMENTS

| | | | |
|---|---|---|---|
| 7,706,948 B2 * | 4/2010 | Dix | A01B 69/008 701/26 |
| 7,747,370 B2 * | 6/2010 | Dix | A01B 69/008 701/23 |
| 8,082,097 B2 | 12/2011 | Hilliar Isaacson | |
| 8,145,390 B2 * | 3/2012 | Dix | A01B 69/008 56/10.2 R |
| 8,548,666 B2 | 10/2013 | Matthews | |
| 8,694,382 B2 | 4/2014 | Aznavorian et al. | |
| 8,738,238 B2 | 5/2014 | Rekow | |
| 8,825,263 B1 | 9/2014 | Nelson, Jr. | |
| 8,983,767 B2 | 3/2015 | Pieper et al. | |
| 9,008,918 B2 | 4/2015 | Missotten et al. | |
| 9,020,757 B2 | 4/2015 | Peake et al. | |
| 2007/0168116 A1 * | 7/2007 | Meyer zu Helligen | G01C 21/20 701/50 |
| 2008/0103694 A1 * | 5/2008 | Dix | A01B 69/008 701/425 |
| 2009/0265053 A1 * | 10/2009 | Dix | A01B 69/008 701/26 |
| 2010/0318253 A1 * | 12/2010 | Brubaker | A01B 69/008 701/25 |
| 2011/0231057 A1 * | 9/2011 | Ashjaee | A01B 69/008 701/41 |
| 2014/0081568 A1 * | 3/2014 | Pieper | G01C 21/00 701/400 |
| 2014/0163806 A1 * | 6/2014 | Aznavorian | G05D 1/021 701/25 |
| 2014/0324291 A1 * | 10/2014 | Jones | E02F 9/2045 701/41 |
| 2016/0021813 A1 * | 1/2016 | Matthews | A01B 79/005 701/26 |

OTHER PUBLICATIONS

"Guidance & Steering," Case IH Agriculture, accessed Jul. 25, 2015, http://www.caseih.com/northamerica/en-us/products/advanced-farming-systems/guidance-steering.

Choudhury et al., "A Coverage Planning Algorithm for Agricultural Robots," IIT & CMU, Aug. 2009, http://www.frc.ri.cm.edu/~sanjiac/Rsearch/bspline/report.pdf.

"Autoturn," Transoft Solutions, accessed Feb. 14, 2017, http://transoftsolutions.com/autoturn/details.

* cited by examiner

SWATH ACQUISITION SYSTEM FOR AN AGRICULTURAL VEHICLE

BACKGROUND

The present disclosure relates generally to a swath acquisition system for an agricultural vehicle.

Certain agricultural vehicles, such as tractors or other prime movers, may be controlled by a control system (e.g., without operator input, with limited operator input, etc.) during certain phases of operation. For example, a controller may instruct a steering control system and/or a speed control system of the agricultural vehicle to automatically or semi-automatically guide the agricultural vehicle along a guidance swath within a field. In certain agricultural vehicles, an operator may manually direct (e.g., steer) the agricultural vehicle to the guidance swath and align the agricultural vehicle with the guidance swath before engaging the control system. Unfortunately, the process of acquiring the guidance swath manually may be inefficient, thereby increasing fuel consumption and/or delaying agricultural operations.

BRIEF DESCRIPTION

In one embodiment, a method for controlling an agricultural vehicle includes receiving, via a processor, a first signal from a user interface indicative of a value of at least one parameter. The method also includes determining, via the processor, a path of the agricultural vehicle toward a guidance swath based at least in part on the at least one parameter. In addition, the method includes outputting, via the processor, a second signal to a display of the user interface indicative of instructions to present a graphical representation of the path of the agricultural vehicle. Furthermore, the method includes controlling the agricultural vehicle, via the processor, based at least in part on the at least one parameter upon receiving at least a third signal from the user interface indicative of acceptance of the value of the at least one parameter.

In another embodiment, a control system for an agricultural vehicle includes a user interface having a display. The user interface is configured to output a first signal indicative of a value of at least one parameter. The control system also includes a controller communicatively coupled to the user interface, in which the controller is configured to determine a path of the agricultural vehicle toward a guidance swath based at least in part on the at least one parameter. In addition, the controller is configured to output a second signal to the display indicative of instructions to display a graphical representation of the path, and the controller is configured to control the agricultural vehicle based at least in part on the at least one parameter upon receiving at least a third signal from the user interface indicative of acceptance of the value of the at least one parameter.

In a further embodiment, an apparatus includes at least one non-transitory, tangible, machine-readable media having instructions encoded thereon for execution by a processor. The instructions include instructions to receive a first signal from a user interface indicative of a value of at least one parameter. The instructions also include instructions to determine a path of an agricultural vehicle toward a guidance swath based at least in part on the at least one parameter. In addition, the instructions include instructions to output a second signal to a display of the user interface indicative of instructions to display a graphical representation of the path of the agricultural vehicle. The instructions also include instructions to control the agricultural vehicle based at least in part on the at least one parameter upon receiving at least a third signal from the user interface indicative of acceptance of the value of the at least one parameter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
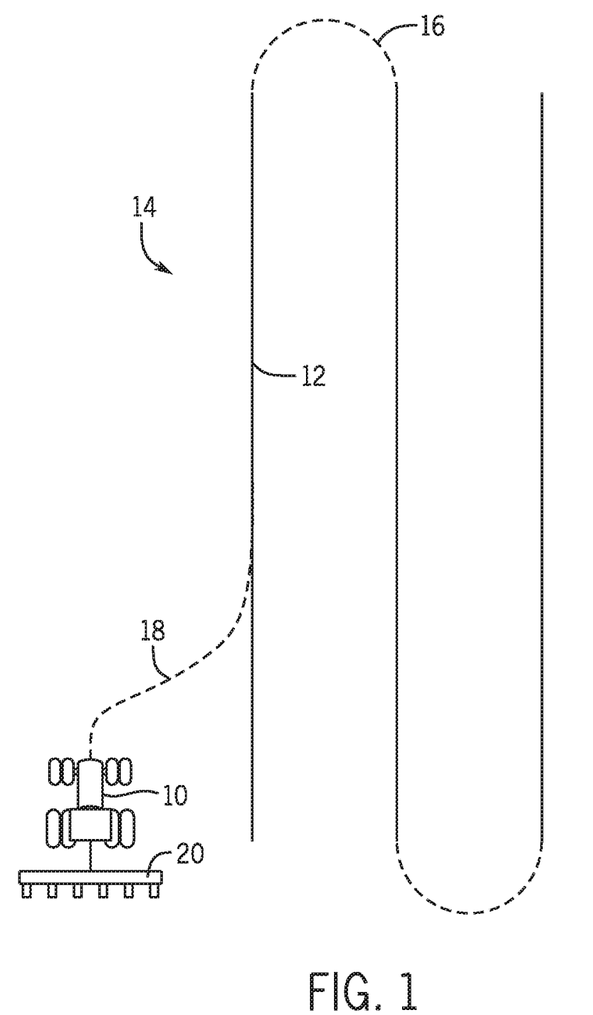
FIG. 1 is a top view of an embodiment of an agricultural vehicle configured to engage and to follow a guidance swath through a field.

Turning now to the drawings, FIG. 1 is a top view of an embodiment of an agricultural vehicle 10 configured to engage and to follow a guidance swath 12 through a field 14. In the illustrated embodiment, the agricultural vehicle 10 includes a control system configured to automatically guide the agricultural vehicle 10 along the guidance swath 12. In certain embodiments, the guidance swath 12 may be established by storing data points associated with locations of an agricultural vehicle as the agricultural vehicle moves through the field. In further embodiments, the guidance swath 12 may be established by drawing the guidance swath on an electronic map of the field. Once the guidance swath 12 is established, the control system may automatically guide the agricultural vehicle 10 along the guidance swath 12 without input from an operator. In certain embodiments, the control system may also automatically guide the agricultural vehicle 10 around headland turns 16 between segments of the guidance swath 12. However, in alternative embodiments, the operator may manually control the agricultural vehicle during the headland turns.

Prior to initiating agricultural operations, the agricultural vehicle 10 may be positioned remote from the guidance swath 12. In certain embodiments, the control system automatically directs the agricultural vehicle 10 along a swath acquisition path 18 to the guidance swath 12 such that the agricultural vehicle 10 is aligned with the guidance swath 12 as agricultural operations are initiated. The swath acquisition path 18 may be adjusted based on operator input of one or more parameters (e.g., an initial turn rate of the agricultural vehicle, an approach angle of the agricultural vehicle toward the guidance swath, a swath turn rate of the agricultural vehicle, an overshoot of the guidance swath, etc.). However, without a precise understanding of the effect of varying the parameter(s), the operator may not select parameter(s) that establish an efficient swath acquisition path 18.

Accordingly, in certain embodiments, the control system presents a visual representation of the swath acquisition path to the operator, which is based at least in part on the parameter(s). The operator may adjust the parameter(s) and view the resultant effect on the swath acquisition path. Once the displayed swath acquisition path is acceptable to the operator, the operator may accept the parameter(s) (e.g., by engaging automatic control of the agricultural vehicle 10). The control system may then control the agricultural vehicle such that the agricultural vehicle is directed along a swath acquisition path 18 that is based at least in part on the accepted parameter(s).

In certain embodiments, the control system includes a user interface having a display. The control system also includes a controller communicatively coupled to the user interface. The user interface is configured to output a first signal to the controller indicative of a value of at least one parameter (e.g., an initial turn rate of the agricultural vehicle, an approach angle of the agricultural vehicle toward the guidance swath, a swath turn rate of the agricultural vehicle, an overshoot of the guidance swath, etc.), and the controller is configured to determine a path of the agricultural vehicle toward the guidance swath based at least in part on the at least one parameter. In addition, the controller is configured to output a second signal to the display indicative of instructions to display a graphical representation of the path. Accordingly, an operator may vary the at least one parameter until the path shown on the display is acceptable to the operator (e.g., places an implement 20 on the guidance swath within a desired duration, reduces lateral loads, etc.). Once an acceptable path is established, the operator may accept the value of the at least one parameter (e.g., by engaging automatic control of the agricultural vehicle via the user interface, by instructing the control system to update the swath acquisition path, etc.). The controller may then control the agricultural vehicle based at least in part on the at least one parameter upon receiving at least a third signal from the user interface indicative of acceptance of the value of the at least one parameter. Because the control system enables the operator to visualize the effect of varying the parameter(s), the operator may select parameter(s) that establish an efficient swath acquisition path (e.g., a swath acquisition path that reduces fuel consumption, reduces swath acquisition time for the implement 20, etc.) and/or a swath acquisition path that reduces lateral loads.

Figure 2:
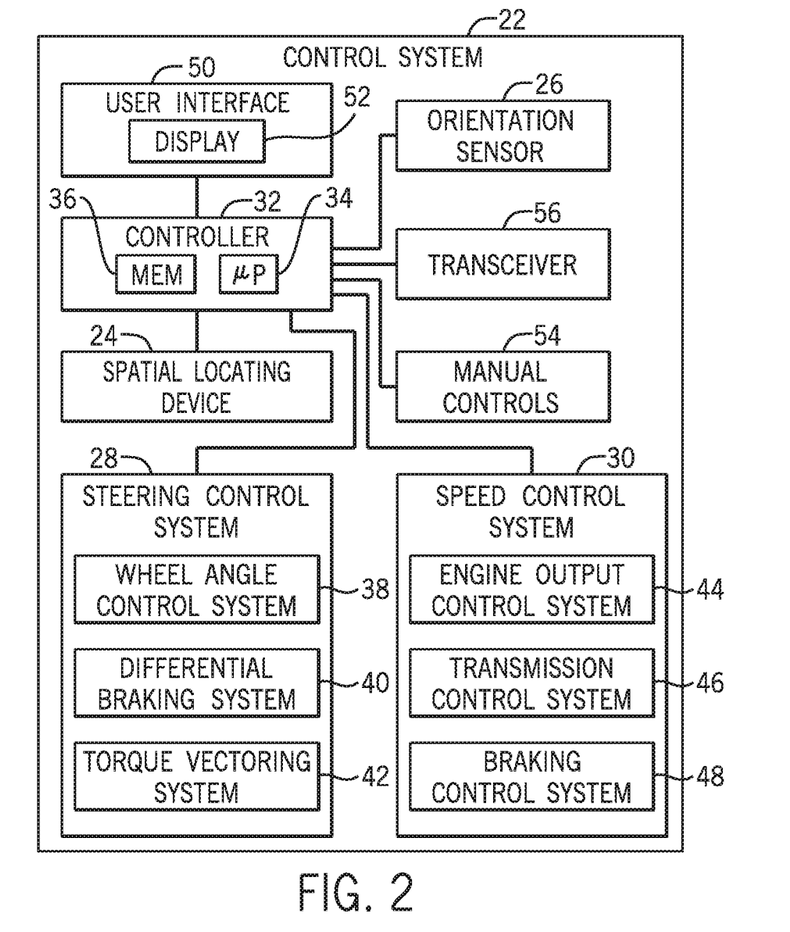
FIG. 2 is a schematic diagram of an embodiment of a control system that may be employed within the agricultural vehicle of FIG. 1.

FIG. 2 is a schematic diagram of an embodiment of a control system 22 that may be employed within the agricultural vehicle of FIG. 1. In the illustrated embodiment, the control system 22 includes a spatial locating device 24, which is mounted to the agricultural vehicle and configured to determine a position and a velocity of the agricultural vehicle. As will be appreciated, the spatial locating device may include any suitable system configured to measure the position and velocity of the agricultural vehicle, such as a global positioning system (GPS) receiver, for example. In certain embodiments, the spatial locating device 24 may be configured to measure the position and velocity of the agricultural vehicle relative to a fixed point within a field (e.g., via a fixed radio transceiver). Accordingly, the spatial locating device 24 may be configured to measure the position and velocity of the agricultural vehicle relative to a fixed global coordinate system (e.g., via the GPS receiver) or a fixed local coordinate system.

In addition, the control system 22 includes an orientation sensor 26 configured to determine a pitch angle, a yaw angle, a roll angle, or a combination thereof, of the agricultural vehicle. For example, the orientation sensor 26 may include a gyroscope or other sensor configured to monitor the orientation of the agricultural vehicle. In certain embodiments, the orientation sensor 26 is also configured to determine a pitch rate, a yaw rate, a roll rate, or a combination thereof.

In the illustrated embodiment, the control system 22 includes a steering control system 28 configured to control a direction of movement of the agricultural vehicle, and a speed control system 30 configured to control a speed of the agricultural vehicle. In addition, the control system 22 includes a controller 32 communicatively coupled to the spatial locating device 24, to the orientation sensor 26, to the steering control system 28, and to the speed control system 30. The controller 32 is configured to automatically control the agricultural vehicle during swath acquisition and while the agricultural vehicle is moving along the guidance swath, thereby enhancing the efficiency of agricultural operations.

In certain embodiments, the controller 32 is an electronic controller having electrical circuitry configured to process data from the spatial locating device 24, the orientation sensor 26, other components of the control system 22, or a combination thereof. In the illustrated embodiment, the controller 32 include a processor, such as the illustrated microprocessor 34, and a memory device 36. The controller 32 may also include one or more storage devices and/or other suitable components. The processor 34 may be used to execute software, such as software for controlling the agricultural vehicle, software for displaying a swath acquisition path, and so forth. Moreover, the processor 34 may include multiple microprocessors, one or more "general-purpose" microprocessors, one or more special-purpose microprocessors, and/or one or more application specific integrated circuits (ASICS), or some combination thereof. For example, the processor 34 may include one or more reduced instruction set (RISC) processors.

The memory device 36 may include a volatile memory, such as random access memory (RAM), and/or a nonvolatile memory, such as read-only memory (ROM). The memory device 36 may store a variety of information and may be used for various purposes. For example, the memory device 36 may store processor-executable instructions (e.g., firmware or software) for the processor 34 to execute, such as instructions for controlling the agricultural vehicle, instructions for displaying a swath acquisition path, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, swath acquisition path parameter(s), etc.), instructions (e.g., software or firmware for controlling the agricultural vehicle, etc.), and any other suitable data.

In the illustrated embodiment, the steering control system 28 includes a wheel angle control system 38, a differential braking system 40, and a torque vectoring system 42. The wheel angle control system 38 may automatically rotate one or more wheels and/or tracks of the agricultural vehicle (e.g., via hydraulic actuators) to steer the agricultural vehicle along a desired route (e.g., along the guidance swath, along the swath acquisition path, etc.). By way of example, the wheel angle control system 38 may rotate front wheels/tracks, rear wheels/tracks, and/or intermediate wheels/tracks of the agricultural vehicle, either individually or in groups. The differential braking system 40 may independently vary the braking force on each lateral side of the agricultural vehicle to direct the agricultural vehicle along a path.

Similarly, the torque vectoring system 42 may differentially apply torque from an engine to wheels and/or tracks on each lateral side of the agricultural vehicle, thereby directing the agricultural vehicle along a path. While the illustrated steering control system 28 includes the wheel angle control system 38, the differential braking system 40, and the torque vectoring system 42, it should be appreciated that alternative embodiments may include one or two of these systems, in any suitable combination. Further embodiments may include a steering control system 28 having other and/or additional systems to facilitate directing the agricultural vehicle along a path through the field.

In the illustrated embodiment, the speed control system 30 includes an engine output control system 44, a transmission control system 46, and a braking control system 48. The engine output control system 44 is configured to vary the output of the engine to control the speed of the agricultural vehicle. For example, the engine output control system 44 may vary a throttle setting of the engine, a fuel/air mixture of the engine, a timing of the engine, other suitable engine parameters to control engine output, or a combination thereof. In addition, the transmission control system 46 may adjust gear selection within a transmission to control the speed of the agricultural vehicle. Furthermore, the braking control system 48 may adjust braking force, thereby controlling the speed of the agricultural vehicle. While the illustrated speed control system 30 includes the engine output control system 44, the transmission control system 46, and the braking control system 48, it should be appreciated that alternative embodiments may include one or two of these systems, in any suitable combination. Further embodiments may include a speed control system 30 having other and/or additional systems to facilitate adjusting the speed of the agricultural vehicle.

In certain embodiments, the control system may also control operation of an agricultural implement coupled to the agricultural vehicle. For example, the control system may include an implement control system/implement controller configured to control a steering angle of the implement (e.g., via an implement steering control system having a wheel angle control system and/or a differential braking system) and/or a speed of the agricultural vehicle/implement system (e.g., via an implement speed control system having a braking control system). In such embodiments, the control system may be communicatively coupled to a control system/controller on the implement via a communication network, such as a controller area network (CAN bus).

In the illustrated embodiment, the control system 22 includes a user interface 50 communicatively coupled to the controller 32. The user interface 50 is configured to selectively instruct the controller 32 to automatically control the agricultural vehicle based on operator input. For example, the operator may position the agricultural vehicle proximate to a guidance swath, and then engage automatic control via input to the user interface 50. The controller 32, in turn, may direct the agricultural vehicle toward the guidance swath (e.g., by providing instructions to the steering control system 28, the speed control system 30, the implement control system/implement controller, or a combination thereof). In certain embodiments, the user interface includes a display 52 configured to present information to the operator, such as a graphical representation of the guidance swath, a graphical representation of the swath acquisition path, a visual representation of certain parameter(s), or a combination thereof. In addition, as discussed in detail below, the user interface 50 (e.g., via the display 52, via other controls, etc.) may enable the operator to input value(s) of certain parameter(s), thereby controlling the visual representation of the swath acquisition path.

In certain embodiments, the user interface 50 is configured to output a first signal indicative of a value of at least one swath acquisition parameter, and the controller 32 is configured to determine a path of the agricultural vehicle toward the guidance swath based at least in part on the at least one parameter. In addition, the controller 32 is configured to output a second signal to the display 52 indicative of instructions to present a graphical representation of the path. Furthermore, the controller 32 is configured to control the agricultural vehicle, and in certain embodiments the agricultural implement, based at least in part on the at least one parameter upon receiving at least a third signal from the user interface 50 indicative of acceptance of the value of the at least one parameter. In certain embodiments, the controller 32 is configured to determine the swath acquisition path by simulating movement of the agricultural vehicle using a guidance algorithm (e.g., including guidance, navigation, and control algorithm(s), a numerical integrator, etc.), and the controller 32 is configured to control the agricultural vehicle using the guidance algorithm. Because the same guidance algorithm is used to simulate movement of the agricultural vehicle and to control movement of the agricultural vehicle, the accuracy of the graphical representation of the swath acquisition path may be enhanced, as compared to using separate guidance algorithms for simulation and control. In certain embodiments, the controller 32 is also configured to determine a path of an agricultural implement coupled to the agricultural vehicle based at least in part on the swath acquisition path, and the controller 32 is configured to output a signal to the display 52 indicative of instructions to present a graphical representation of the path of the agricultural implement. Displaying the path of the agricultural implement may enable the operator to select value(s) of certain parameter(s) that establish a swath acquisition path that quickly and accurately places the agricultural implement on the guidance swath and aligns the agricultural implement with the guidance swath, thereby increasing the efficiency of the swath acquisition process.

In the illustrated embodiment, the control system 22 includes manual controls 54 configured to enable an operator to control the agricultural vehicle while automatic control is disengaged. The manual controls 54 may include manual steering control, manual transmission control, manual braking control, or a combination thereof, among other controls. In the illustrated embodiment, the manual controls 54 are communicatively coupled to the controller 32. The controller 32 is configured to disengage automatic control of the agricultural vehicle upon receiving a signal indicative of manual control of the agricultural vehicle. Accordingly, if an operator controls the agricultural vehicle manually, the automatic swath acquisition or swath following process terminates, thereby restoring control of the agricultural vehicle to the operator.

In the illustrated embodiment, the control system 22 includes a transceiver 56 communicatively coupled to the controller 32. In certain embodiments, the transceiver 56 is configured to establish a communication link with a corresponding transceiver of a base station, thereby facilitating communication between the base station and the control system of the agricultural vehicle. For example, the base station may include a user interface that enables a remote operator to provide instructions to the control system (e.g., instructions to initiate automatic control of the agricultural vehicle, instructions to direct the agricultural vehicle along a path, etc.). The user interface may also enable a remote operator to provide data to the control system (e.g., the parameter(s) for establishing the swath acquisition path, data associated with field conditions, data associated with the guidance swath, etc.). The transceiver 56 may operate at any suitable frequency range within the electromagnetic spectrum. For example, in certain embodiments, the transceiver 56 may broadcast and receive radio waves within a frequency range of about 1 GHz to about 10 GHz. In addition, the transceiver 56 may utilize any suitable communication protocol, such as a standard protocol (e.g., Wi-Fi, Bluetooth, etc.) or a proprietary protocol.

Figure 3:
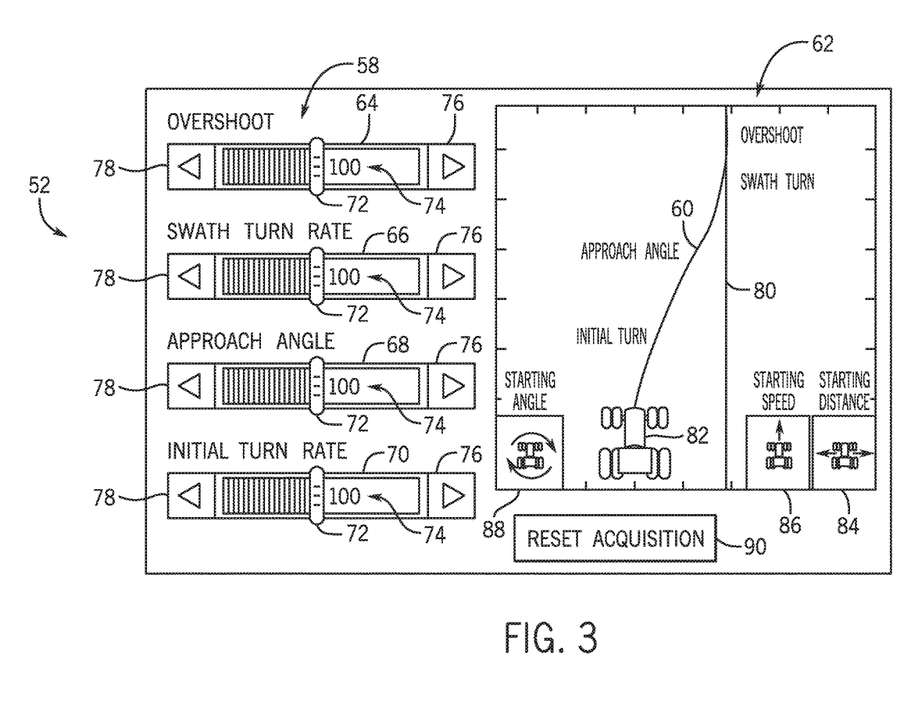
FIG. 3 is a diagram of an embodiment of a display that may be employed within a user interface of the control system of FIG. 2.

FIG. 3 is a diagram of an embodiment of a display 52 that may be employed within the user interface of the control system of FIG. 2. In the illustrated embodiment, the display 52 is configured to present a visual representation of values of the swath acquisition parameters within a swath acquisition parameter section 58 and to present a graphical representation of the swath acquisition path 60 within a path visualization section 62 of the display 52. While the swath acquisition parameter section 58 is to the left of the path visualization section 62 in the illustrated embodiment, it should be appreciated that in alternative embodiments, the swath acquisition parameter section 58 and/or the path visualization section 62 may be in any suitable location on the display 52. In the illustrated embodiment, the display 52 is a touch sensitive display. Accordingly, the values of the swath acquisition parameters may be adjusted via interaction with the display 52. However, in alternative embodiments, the user interface may include other controls (e.g., switches, button, knobs, etc.) configured to enable an operator to adjust the values of the swath acquisition parameters.

In the illustrated embodiment, the swath acquisition parameter section 58 includes an overshoot adjustment control 64, a swath turn rate control 66, an approach angle control 68, and an initial turn rate control 70. As illustrated, each control includes a virtual slider 72 configured to adjust the value of the respective parameter, and each control includes a numerical representation 74 of the value of the respective parameter. To adjust the value of each parameter, the respective slider 72 may be moved along a slider path. As the slider moves, the numerical representation 74 of the respective parameter changes based on the position of the slider 72 along the slider path. Each slider 72 may be moved by direct interaction, or by selecting an increase value arrow 76 or a decrease value arrow 78. While each control includes a slider and a numeric representation of the parameter value in the illustrated embodiment, it should be appreciated that in alternative embodiments, other control(s) and/or representation(s) of the parameter value may be displayed. For example, in certain embodiments, each control may include a virtual knob, a virtual dial, a field in which a number may be entered by a virtual keypad, or a combination thereof, among other input techniques. In addition, in certain embodiments, each control may include a graphical representation (e.g., a graph, a dial, etc.) of the value of the respective parameter. Furthermore, in certain embodiments, the parameter adjustment input/control may be positioned remote from the visual representation of the respective parameter.

In the illustrated embodiment, the path visualization section 62 of the display 52 includes a graphical representation of the swath acquisition path 60 and a graphical representation of the guidance swath 80. The path visualization section 62 also includes a graphical representation of the agricultural vehicle 82. As illustrated, the graphical representation of the agricultural vehicle 82 is positioned remote from the graphical representation of the guidance swath 80, indicating that the agricultural vehicle is positioned remote from the guidance swath. In certain embodiments, the distance between the agricultural vehicle and the guidance swath may be manually entered (e.g., via a virtual numeric keypad) by depressing the "starting distance" virtual button 84. In addition, the initial speed of the agricultural vehicle (e.g., the speed of the agricultural vehicle before initiation of the swath acquisition process) may be manually entered (e.g., via a virtual numeric keypad) by depressing the "starting speed" virtual button 86. Furthermore, the angle between the initial agricultural vehicle path (e.g., the agricultural vehicle path before initiation of the swath acquisition process) and the guidance swath may be manually entered (e.g., via a virtual numeric keypad) by depressing the "starting angle" virtual button 88. Because the values may be manually entered, the operator may enter current values, expected values, test/example values, or a combination thereof. Furthermore, while the virtual buttons are located at the bottom of the path visualization section 62 of the display 52 in the illustrated embodiment, it should be appreciated that in alternative embodiments, the virtual buttons may be located in any other suitable portion of the display.

In further embodiments, the distance between the agricultural vehicle and the guidance swath, the initial speed of the agricultural vehicle (e.g., the speed of the agricultural vehicle before initiation of the swath acquisition process), the angle between the initial agricultural vehicle path (e.g., the agricultural vehicle path before initiation of the swath acquisition process) and the guidance swath, or a combination thereof, may be determined by the controller (e.g., based on input from the spatial locating device and/or the orientation sensor). In such embodiments, the virtual buttons may be omitted, or the virtual buttons may enable the operator to manually override the values determined by the controller While the illustrated embodiment includes virtual buttons for "staring distance", "starting speed", and "starting angle", it should be appreciated that in alternative embodiments, the display may present a subset of the virtual buttons and/or other/additional virtual buttons. For example, in certain embodiments, the display may present a "starting curvature" button that enables an operator to input the initial turning radius of the agricultural vehicle. Additionally or alternatively, the controller may be configured to automatically determine other and/or additional starting parameters, such as the initial turning radius of the agricultural vehicle. Once the value(s) of the starting parameter(s) are manually input (e.g., using the virtual buttons) or determined, the controller may instruct the display to position the graphical representation of the agricultural vehicle 82 in the corresponding location and orientation within the path visualization section 62 of the display 52.

In the illustrated embodiment, the controller determines the swath acquisition path based at least in part on the starting parameter(s) and the swath acquisition path parameter(s) input via the controls in the swath acquisition parameter section 58 of the display 52. The controller then outputs a signal to the display indicative of instructions to present the swath acquisition path, and the display 52 displays the graphical representation of the swath acquisition path 60 in the path visualization section 62 of the display 52. The swath acquisition path includes an initial turn to an approach angle. In the illustrated embodiment, the "initial turn" and "approach angle" are labeled on the graphical representation of the swath acquisition path 60. The rate of the initial turn may be input via the initial turn rate control 70, and the approach angle (e.g., the angle between the initial path of the agricultural vehicle and the path toward the guidance swath) may be input via the approach angle control 68. The swath acquisition path also includes a swath turn and an overshoot. In the illustrated embodiment, the "swath turn" and the "overshoot" are labeled on the graphical representation of the swath acquisition path 60. The rate of the swath turn may be input via the swath turn rate control 66, and the overshoot (e.g., the distance the agricultural vehicle overshoots the guidance swath before returning to the guidance swath) may be input via the overshoot control 64.

The initial turn rate may be selected to reduce the duration associated with acquisition of the guidance swath and to reduce the lateral load on the agricultural vehicle. For example, a higher initial turn rate may reduce the guidance swath acquisition duration and increase the lateral load on the agricultural vehicle. In addition, a lower initial turn rate may increase the guidance swath acquisition duration and reduce the lateral load on the agricultural vehicle. Accordingly, the initial turn rate may be selected to balance the guidance swath acquisition duration with the desired lateral load. As will be appreciated, the initial turn rate may be limited by the capabilities of the agricultural vehicle/implement (e.g., maximum turn angle of the wheels/tracks, configuration of the implement and/or hitch assembly, etc.). In certain embodiments, the initial turn rate input via the initial turn rate control 70 corresponds to the maximum turn rate of the agricultural vehicle during the initial turn. Furthermore, in certain embodiments, the initial turn rate control 70 may enable the operator to select an initial turn rate of between about 1 to about 10 degrees per second, about 1 to about 7 degrees per second, or about 1 to about 5 degrees per second, for example.

The approach angle may be selected to reduce the distance traveled between the initial agricultural vehicle position and the guidance swath and to provide a smooth transition between segments of the swath acquisition path. For example, a steeper approach angle may reduce the distance traveled between the initial agricultural vehicle position and the guidance swath, and increase the swath turn angle. In addition, a shallower approach angle may increase the distance traveled between the initial agricultural vehicle position and the guidance swath, and reduce the swath turn angle. Accordingly, the approach angle may be selected to balance the distance traveled between the initial agricultural vehicle position and the guidance swath with the swath turn angle. Furthermore, when the agricultural vehicle is moving at a higher speed, the operator may select a shallower approach angle to reduce the lateral load on the agricultural vehicle at the initial turn and at the swath turn (e.g., due to an increased radius of curvature at the turns). In addition, when the agricultural vehicle is moving at a lower speed, the operator may select a steeper approach angle to reduce the distanced traveled between the initial agricultural vehicle position and the guidance swath. In certain embodiments, the approach angle control 68 may enable the operator to select an approach angle between about 5 to about 120 degrees, about 10 to about 100 degrees, or about 20 to about 90 degrees, for example.

The swath turn rate may be selected to reduce the duration associated with acquisition of the guidance swath and to reduce the lateral load on the agricultural vehicle. For example, a higher swath turn rate may reduce the guidance swath acquisition duration and increase the lateral load on the agricultural vehicle. In addition, a lower swath turn rate may increase the guidance swath acquisition duration and reduce the lateral load on the agricultural vehicle. Accordingly, the swath turn rate may be selected to balance the guidance swath acquisition duration with the desired lateral load. As will be appreciated, the swath turn rate may be limited by the capabilities of the agricultural vehicle/implement (e.g., maximum turn angle of the wheels/tracks, configuration of the implement and/or hitch assembly, etc.). In certain embodiments, the swath turn rate input via the swath turn rate control 66 corresponds to the maximum turn rate of the agricultural vehicle at the swath turn. Furthermore, in certain embodiments, the swath turn rate control 66 may enable the operator to select a swath turn rate of between about 1 to about 10 degrees per second, about 1 to about 7 degrees per second, or about 1 to about 5 degrees per second, for example.

In certain embodiments, the controller may be configured to determine an expected maximum lateral load during the initial turn and/or during the swath turn. In such embodiments, the controller may be configured to output a signal to the display indicative of instructions to present a visual indication of the maximum lateral load (e.g., via a numerical value, a gauge, etc.). As a result, the effect of adjusting the initial turn rate and/or the swath turn rate may be visualized.

As discussed in detail below, the overshoot may be selected to reduce the duration associated with acquisition of the guidance swath by an agricultural implement coupled to the agricultural vehicle. For example, a smaller overshoot may be selected while the agricultural vehicle is not towing an agricultural implement or while the agricultural vehicle is towing a smaller/more maneuverable agricultural implement. In addition, a larger overshoot may be selected while the agricultural vehicle is towing a larger/less maneuverable agricultural implement. In certain embodiments, the overshoot input via the overshoot control 64 corresponds to the maximum distance the agricultural vehicle overshoots the guidance swath before returning to the guidance swath. Furthermore, in certain embodiments, the overshoot control 64 may enable the operator to select an overshoot of between about 0 to about 50 meters, about 0 to about 40 meters, or about 0 to about 30 meters, for example.

In the illustrated embodiment, the display 52 includes a "reset acquisition" virtual button 90. Depressing the "reset acquisition" virtual button resets the overshoot, the swath turn rate, the approach angle, and the initial turn rate to default values (e.g., corresponding to the respective sliders being positioned in the center of the slider path). After resetting the acquisition, the operator may readjust the controls to achieve the desired swath acquisition path.

To establish a desired swath acquisition path, the operator may adjust the overshoot control 64, the swath turn rate control 66, the approach angle control 68, the initial turn rate control 70, or a combination thereof. As the operator adjust the controls, the graphical representation of the swath acquisition path 60 automatically changes based on the updated parameter(s). Once the operator finds the swath acquisition path acceptable, the operator may engage automatic guidance (e.g., via the user interface), thereby sending a signal to the controller indicative of acceptance of the value(s) of the swath acquisition parameter(s). The controller then controls the agricultural vehicle based at least in part on the swath acquisition parameter(s), thereby directing the agricultural vehicle along the desired swath acquisition path.

The graphical representation of the swath acquisition path 60 corresponds to a swath acquisition path determined by the controller. In certain embodiments, the controller is configured to determine the swath acquisition path by simulating movement of the agricultural vehicle using a guidance algorithm (e.g., including guidance, navigation, and control algorithm(s), a numerical integrator, etc.). In addition, the controller is configured to control the agricultural vehicle using the guidance algorithm. Because the same guidance algorithm is used to simulate movement of the agricultural vehicle and to control movement of the agricultural vehicle, the accuracy of the graphical representation of the swath acquisition path may be enhanced, as compared to using separate guidance algorithms for simulation and control.

While the display 52 presents the overshoot control 64, the swath turn rate control 66, the approach angle control 68, and the initial turn rate control 70 in the illustrated embodiment, it should be appreciated that in alternative embodiments, the display may present a subset of the controls (e.g., only one control, only two controls, or only three controls). In further embodiments, the display may present other and/or additional controls, such as swath acquisition path length and/or angular acceleration of one or more turns, among other controls. While the controller determines the swath acquisition path and controls the agricultural vehicle (e.g., directs the agricultural vehicle along the swath acquisition path) based at least in part on the initial turn rate, the approach angle, the swath turn rate, and the overshoot, it should be appreciated that in certain embodiments, the controller may determine the swath acquisition path and control the agricultural vehicle based at least in part on a subset of these parameters and/or other swath acquisition parameter(s). For example, in certain embodiments, the controller may determine the swath acquisition path and control the agricultural vehicle based at least in part on one or more of overshoot, swath turn rate, approach angle, initial turn rate, and other swath acquisition parameter(s).

In certain embodiments, the controller may determine the swath acquisition path and control the agricultural vehicle based at least in part on the capabilities and/or dimensions of the agricultural vehicle and/or the agricultural implement. For example, the swath acquisition path may be determined and the agricultural vehicle may be controlled based at least in part on the dimensions of the agricultural vehicle, the dimensions of the agricultural implement, the position and type of wheels/tracks on the agricultural implement (e.g., caster wheels/tracks, non-caster wheels/tracks, steerable wheels/tracks, etc.), the type/configuration of the hitch assembly coupling the agricultural implement to the agricultural vehicle, the maximum steering rate of the agricultural vehicle, the minimum turn radius of the agricultural vehicle, or a combination thereof, among other vehicle/implement parameter(s). In addition, the controller may determine the swath acquisition path and control the agricultural vehicle based at least in part on field condition(s), weather condition(s), field topography, or a combination thereof, among other external parameter(s).

While the tractor moves in a forward direction along the swath acquisition path to the guidance swath, it should be appreciated that the agricultural vehicle may also move in a rearward direction along the swath acquisition path to the guidance swath. For example, the controller may determine a swath acquisition path that extends from the initial position of the agricultural vehicle rearward to the guidance swath, and the controller may instruct the agricultural vehicle to move along the rearward swath acquisition path to the guidance swath. Upon reaching the guidance swath, the agricultural vehicle may continue in the rearward direction or move in a forward direction along the guidance swath. In certain embodiments, the user interface may include a control and/or the display may include a virtual control that enables the operator to select whether the controller determines a forward or rearward swath acquisition path and directs the agricultural vehicle to move in a forward or rearward direction toward the guidance swath.

In certain embodiments, the display may include an "accept parameters" virtual control (e.g., virtual button, etc.), and/or the user interface may include an "accept parameters" control (e.g., button, etc.). In such embodiments, actuating the control/virtual control induces the user interface to output a signal to the controller indicative of acceptance of the swath acquisition parameters. Upon engagement of automatic guidance, the controller controls the agricultural vehicle such that the agricultural vehicle moves along the path established by the accepted parameters. In certain embodiments, with automatic guidance active, actuating the "accept parameters" control/virtual control induces the user interface to output a signal to the controller indicative of instructions to update the swath acquisition parameter(s) such that the agricultural vehicle is directed along an updated swath acquisition path that is based on the updated parameter(s). In addition, while the graphical representation of the swath acquisition path 60 automatically changes in response to actuating the swath acquisition parameter control(s), it should be appreciated that in certain embodiments, the graphical representation of the swath acquisition path may not be updated until the user depresses an "update" button on the user interface or an "update" virtual button on the display.

In certain embodiments, the controller may be configured to instruct the display to present multiple graphical representations of swath acquisition paths. For example, the controller may instruct the display to present a graphical representation of a first swath acquisition path based on default value(s) of the parameter(s) and a graphical representation of a second swath acquisition path based on the current value(s) of the parameter(s). Displaying multiple graphical representations of swath acquisition paths may enable the operator to compare multiple swath acquisition paths to facilitate determination of the desired value(s) of the parameter(s).

In certain embodiments, the controller may enable the operator to save parameter value(s) associated with a swath acquisition path. For example, if an operator adjusts the value(s) of the parameter(s) and establishes a desired swath acquisition path for a certain agricultural vehicle (e.g., floater, harvester, combine, etc.) or for a certain agricultural vehicle/agricultural implement combination (e.g., tractor and planter, tractor and tillage tool, etc.), the operator may save the value(s) of the parameter(s) (e.g., by depressing a "save parameter(s)" button on the user interface or a "save parameter(s)" virtual button on the display). In certain embodiments, the user interface may enable the operator to associate the saved parameter value(s) with an agricultural vehicle or an agricultural vehicle/agricultural implement combination. Accordingly, during a subsequent swath acquisition process, the operator may load the saved parameter value(s) for the agricultural vehicle or for the agricultural vehicle/agricultural implement combination (e.g., by depressing a "load parameter(s)" button on the user interface or a "load parameter(s)" virtual button on the display), thereby reducing the duration associated with establishing the desired swath acquisition path.

In certain embodiments, the controller may be configured to automatically determine the swath acquisition parameter value(s) based at least in part on the starting distance, the starting speed, the starting angle, or a combination thereof, among other parameters (e.g., field condition(s), weather condition(s), field topography, etc.). By way of example, the initial turn rate, the approach angle, the swath turn rate, or a combination thereof, may be determined at least in part based on the starting speed of the agricultural implement. For example, when the starting speed of the agricultural vehicle is faster, the controller may select a shallower approach angle and/or lower turn rates to reduce the lateral load on the agricultural vehicle at the initial turn and at the swath turn. In addition, when the starting speed of the agricultural vehicle is slower, the controller may select a steeper approach angle and/or higher turn rates to reduce the duration associated with acquiring the guidance swath. The controller may also determine and/or receive an input indicative of the capabilities and/or dimensions of the agricultural vehicle (e.g., the dimensions of the agricultural vehicle, the maximum turn rate of the agricultural vehicle, the minimum turn radius of the agricultural vehicle, etc.) and/or the agricultural implement (e.g., the dimensions of the agricultural implement, the position and/or type of wheels/tracks on the agricultural implement, the type/condition of the hitch assembly coupling the agricultural implement to the agricultural vehicle, etc.), and determine the swath acquisition parameter value(s) based at least in part on the input. By way of example, the overshoot may be determined based at least in part on the type/configuration of the agricultural implement. For example, the controller may establish a smaller overshoot while the agricultural vehicle is not towing an agricultural implement or while the agricultural vehicle is towing a smaller/more maneuverable agricultural implement. In addition, the controller may establish a larger overshoot while the agricultural vehicle is towing a larger/less maneuverable agricultural implement.

In addition, the user interface may include an "automatically generate swath acquisition path" control (e.g., button, etc.), and/or the display may include an "automatically generate swath acquisition path" virtual control (e.g., virtual button, etc.). Actuating the control/virtual control may instruct the controller to automatically determine swath acquisition parameter value(s), to change the parameter value(s) presented on the display, and to present a graphical representation of the swath acquisition path on the display based at least in part on the determined parameter value(s). Once the swath acquisition parameter value(s) are determined, the operator may accept the value(s) or manually adjust certain value(s) to establish the desired swath acquisition path. In certain embodiments (e.g., in embodiments in which the controller does not receive a signal indicative of the presence of the agricultural implement), the user interface may include a first control/virtual control for instructing the controller to automatically determine swath acquisition parameter value(s) for the agricultural vehicle alone, and a second control/virtual control for instructing the controller to automatically determine swath acquisition parameter value(s) for the agricultural vehicle/agricultural implement combination.

Figure 4A:
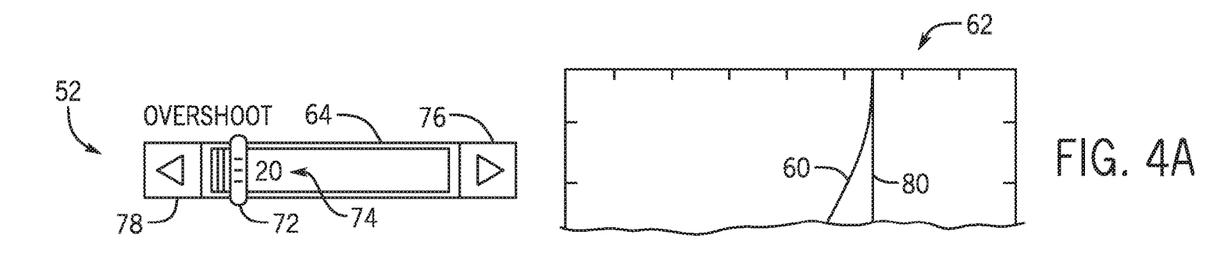
FIGS. 4A-4C are diagrams of a portion of the display of FIG. 3, in which each diagram shows a different overshoot.
Figure 4B:
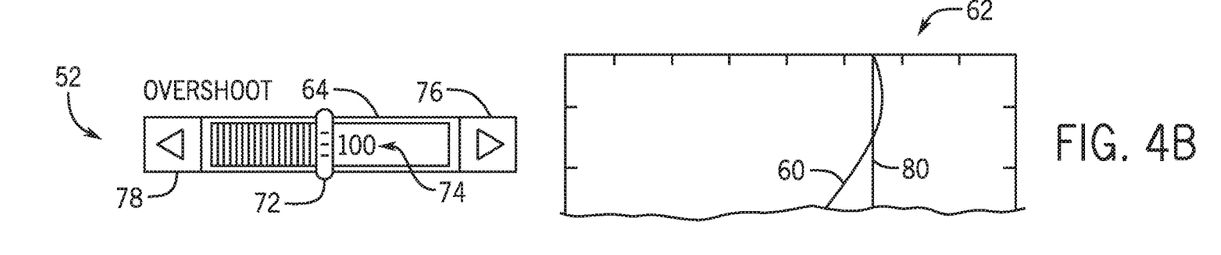
Figure 4C:
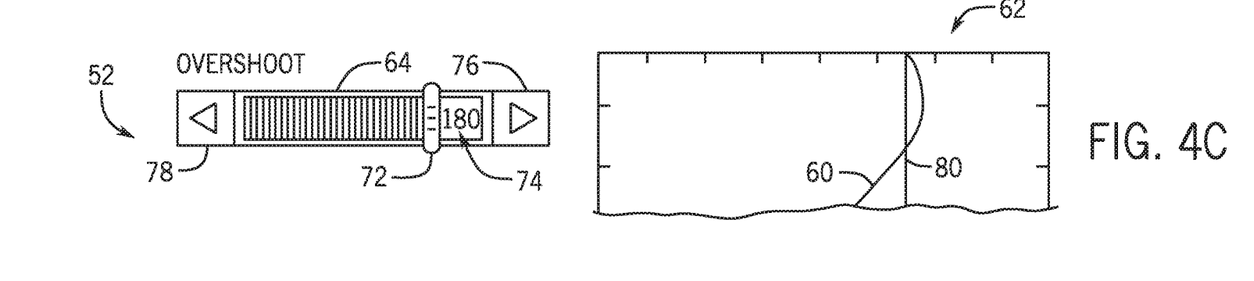

FIGS. 4A-4C are diagrams of a portion of the display 52 of FIG. 3, in which each diagram shows a different overshoot. As previously discussed, the overshoot may be selected to reduce the duration associated with acquisition of the guidance swath by an agricultural implement coupled to the agricultural vehicle. For example, as shown in FIG. 4A, a small overshoot may be selected while the agricultural vehicle is not towing an agricultural implement. In addition, as shown in FIG. 4B, a medium overshoot may be selected while the agricultural vehicle is towing a smaller/more maneuverable agricultural implement. Furthermore, as shown in FIG. 4C, a large overshoot may be selected while the agricultural vehicle is towing a larger/less maneuverable agricultural implement. In certain embodiments, the overshoot input via the overshoot control 64 corresponds to the maximum distance the agricultural vehicle overshoots the guidance swath before returning to the guidance swath.

Figure 5:
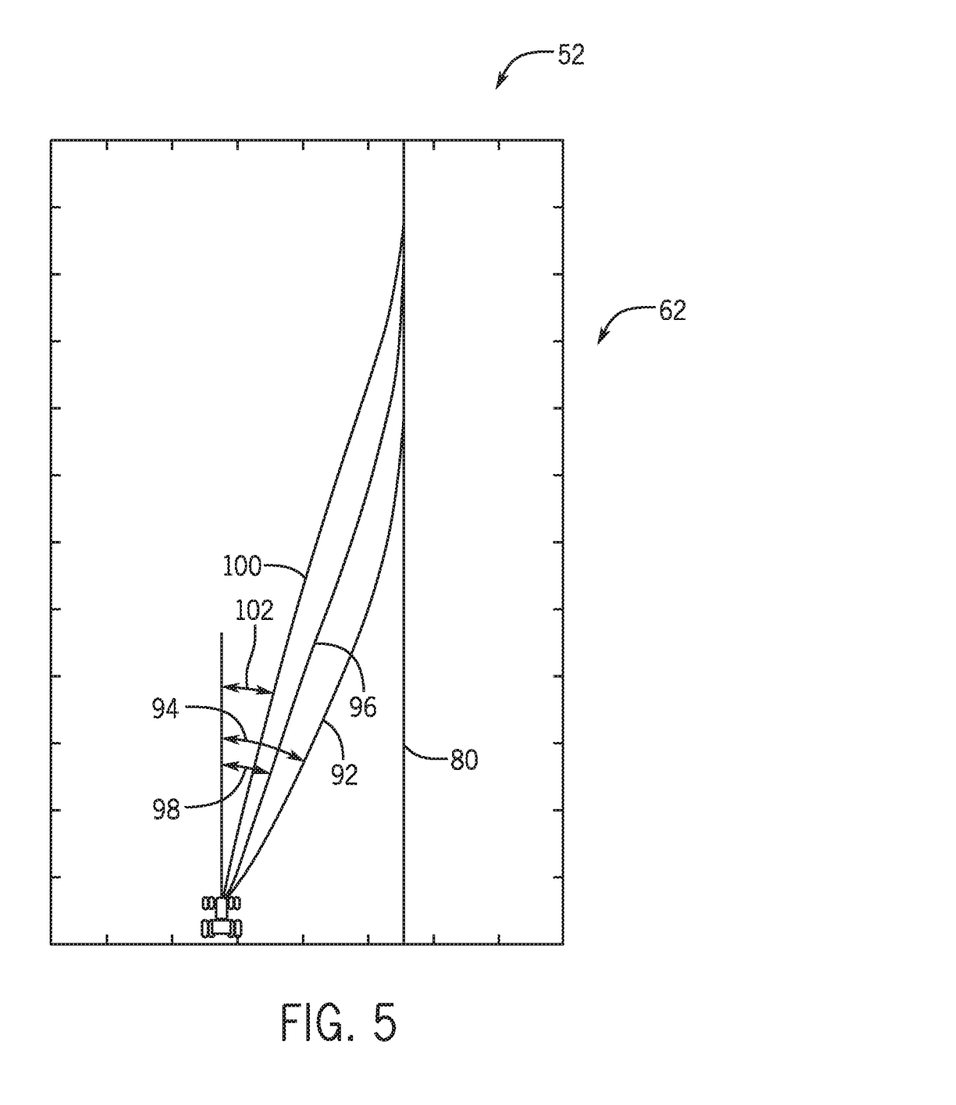
FIG. 5 is a diagram of a portion of the display of FIG. 3, showing different approach angles to the guidance swath.

FIG. 5 is a diagram of a portion of the display 52 of FIG. 3, showing different approach angles to the guidance swath. As previously discussed, the approach angle may be selected to reduce the distance traveled between the initial agricultural vehicle position and the guidance swath and to provide a smooth transition between segments of the swath acquisition path. For example, as represented by a first graphical representation of a swath acquisition path 92, a large approach angle 94 may reduce the distance traveled between the initial agricultural vehicle position and the guidance swath and increase the swath turn angle. In addition, as represented by a second graphical representation of a swath acquisition path 96, a medium approach angle 98 may increase the distance traveled between the initial agricultural vehicle position and the guidance swath and reduce the swath turn angle, as compared to the large approach angle 94. Furthermore, as represented by a third graphical representation of a swath acquisition path 100, a small approach angle 102 may increase the distance traveled between the initial agricultural vehicle position and the guidance swath and reduce the swath turn angle, as compared to the medium approach angle 98 and the large approach angle 94. Accordingly, the approach angle may be selected to balance the distance traveled between the initial agricultural vehicle position and the guidance swath with the swath turn angle.

Figure 6:
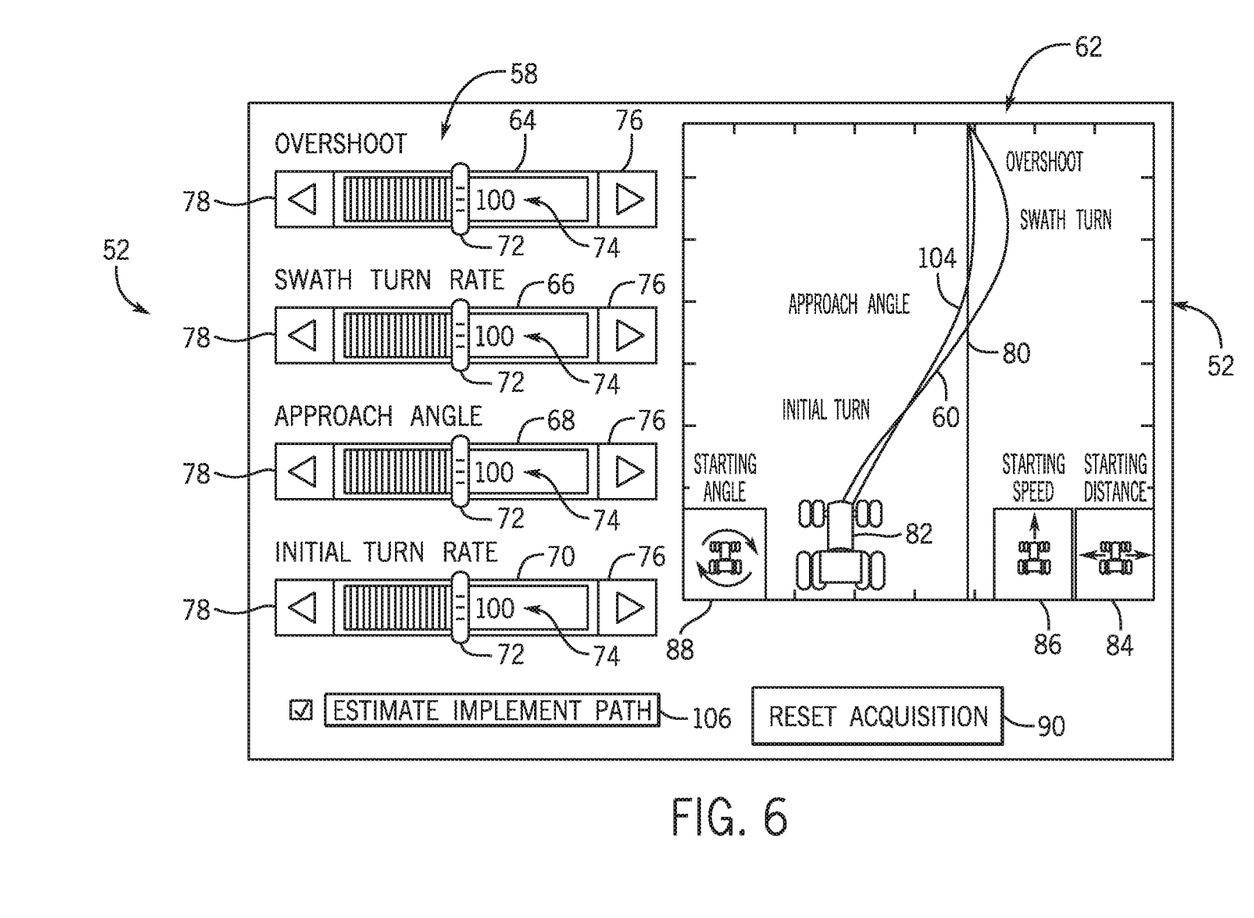
FIG. 6 is a diagram of an alternative embodiment of a display that may be employed within a user interface of the control system of FIG. 2.

FIG. 6 is a diagram of an alternative embodiment of a display 52 that may be employed within a user interface of the control system of FIG. 2. In the illustrated embodiment, the controller is configured to determine a path of an agricultural implement coupled to the agricultural vehicle based at least in part on the swath acquisition path, and the controller is configured to output a signal to the display 52 indicative of instructions to present a graphical representation of the path of the agricultural implement 104. In certain embodiments, the controller may determine the path of the agricultural implement based at least in part on the type of agricultural implement, the configuration of the agricultural implement, the dimensions of the agricultural implement, the position and/or type of wheels/tracks on the agricultural implement (e.g., caster wheels/tracks, non-caster wheels/tracks, steerable wheels/tracks, etc.), the type/configuration of the hitch assembly coupling the agricultural implement to the agricultural vehicle, or a combination thereof, among other parameters. In the illustrated embodiment, the display 52 presents an "estimate implement path" checkbox that controls whether the agricultural implement path is displayed. In certain embodiments, the agricultural implement path may be automatically displayed if the controller detects the presence of an agricultural implement coupled to the agricultural vehicle. In such embodiments, the "estimate implement path" checkbox may be omitted.

Figure 7:
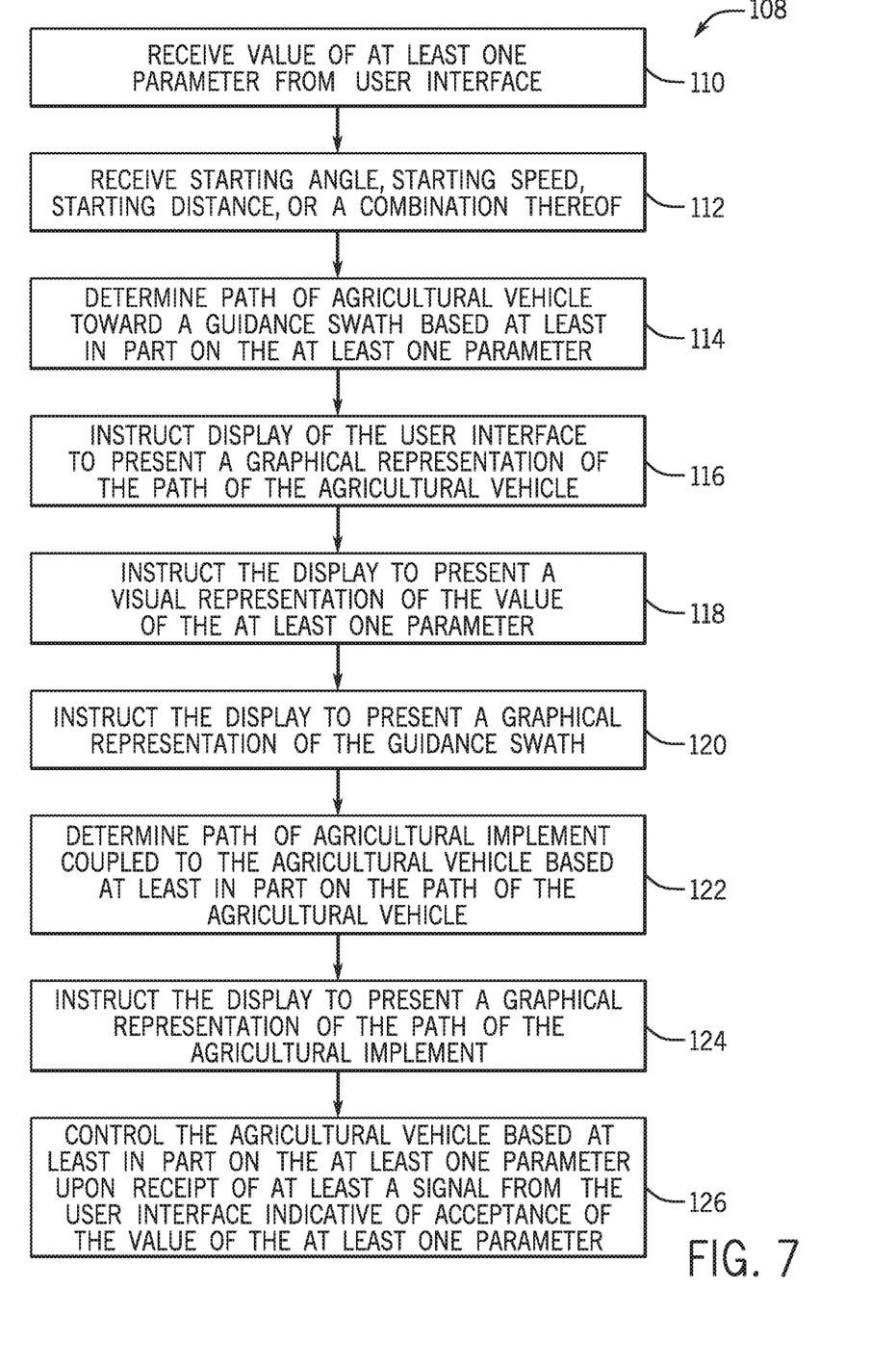
FIG. 7 is a flow diagram of an embodiment of a method for controlling an agricultural vehicle.

FIG. 7 is a flow diagram of an embodiment of a method 108 for controlling an agricultural vehicle. The method 108 may be stored as instructions in at least one non-transitory, tangible, machine-readable media, such as the memory device, and executed by a processor, such as the microprocessor. First, as represented by block 110, a value of at least one parameter is received from a user interface. As previously discussed, the at least one parameter may include an initial turn rate of the agricultural vehicle, an approach angle of the agricultural vehicle toward the guidance swath, a swath turn rate of the agricultural vehicle, an overshoot of the guidance swath, or a combination thereof, among other parameters. Next, as represented by block 112, a starting angle (e.g., the angle between the initial agricultural vehicle path and the guidance swath), a starting speed (e.g., the initial speed of the agricultural vehicle), a starting distance (e.g., the distance between the agricultural vehicle and the guidance swath), or a combination thereof is received. As previously discussed, the starting angle, the starting speed, the starting distance, or a combination thereof, may be manually entered and/or determined by the controller (e.g., based on input from the spatial locating device and/or the orientation sensor).

The path of the agricultural vehicle toward the guidance swath is then determined based at least in part on the at least one parameter, as represented by block 114. For example, the controller may be configured to determine the swath acquisition path by simulating movement of the agricultural vehicle using a guidance algorithm (e.g., including guidance, navigation, and control algorithm(s), a numerical integrator, etc.). The display of the user interface is then instructed to present a graphical representation of the path of the agricultural vehicle, as represented by block 116. In certain embodiments, the display of the user interface is also instructed to present a visual representation of the value of the at least one parameter (e.g., via guidance swath parameter control(s)), as represented by block 118, and/or the display of the user interface is instructed to present a graphical representation of the guidance swath, as represented by block 120. Furthermore, in certain embodiments, the path of an agricultural implement coupled to the agricultural vehicle is determined based at least in part on the path of the agricultural vehicle, as represented by block 122, and the display of the user interface is instructed to present a graphical representation of the path of the agricultural implement, as represented by block 124. Upon receiving at least a signal from the user interface indicative of acceptance of the value of the at least one parameter, the agricultural vehicle is controlled based at least in part on the at least one parameter, as represented by block 126. As previously discussed, the signal indicative of acceptance of the value of the at least one parameter may be output by the user interface upon engaging automatic control or upon actuation of an "accept parameters" control/virtual control.

By way of example, to establish a desired swath acquisition path, the operator may adjust certain control(s) of the user interface to control the value(s) of certain swath acquisition parameter(s). As the operator adjusts the control(s), the graphical representation of the swath acquisition path may automatically change based on the updated parameter(s). Once the operator finds the swath acquisition path acceptable, the operator may engage automatic control (e.g., via the user interface), thereby sending a signal to the controller indicative of acceptance of the value(s) of the swath acquisition parameter(s). The controller then controls the agricultural vehicle based at least in part on the swath acquisition parameter(s) such that the agricultural vehicle is directed along the desired swath acquisition path.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method for controlling an agricultural vehicle, comprising:
   receiving, via a processor, a first signal from a user interface indicative of a value of at least one parameter;
   determining, via the processor, a path of the agricultural vehicle toward a guidance swath based at least in part on the at least one parameter;
   outputting, via the processor, a second signal to a display of the user interface indicative of instructions to present a graphical representation of the path of the agricultural vehicle; and
   controlling the agricultural vehicle, via the processor, based at least in part on the at least one parameter upon receiving at least a third signal from the user interface indicative of acceptance of the value of the at least one parameter.

2. The method of claim 1, wherein the at least one parameter comprises an initial turn rate of the agricultural vehicle, an approach angle of the agricultural vehicle toward the guidance swath, a swath turn rate of the agricultural vehicle, an overshoot of the guidance swath, or a combination thereof.

3. The method of claim 1, comprising outputting, via the processor, a fourth signal to the display of the user interface indicative of instructions to present a visual representation of the value of the at least one parameter.

4. The method of claim 1, comprising outputting, via the processor, a fifth signal to the display indicative of instructions to present a graphical representation of the guidance swath.

5. The method of claim 1, comprising:
   determining, via the processor, a path of an agricultural implement coupled to the agricultural vehicle based at least in part on the path of the agricultural vehicle; and
   outputting, via the processor, a sixth signal to the display indicative of instructions to present a graphical representation of the path of the agricultural implement.

6. The method of claim 1, comprising receiving, via the processor, a seventh signal from the user interface indicative of a starting angle of the agricultural vehicle relative to the guidance swath, a starting speed of the agricultural vehicle, a starting distance of the agricultural vehicle from the guidance swath, or a combination thereof, wherein determining the path of the agricultural vehicle is based at least in part on the starting angle, the starting speed, the starting distance, or a combination thereof.

7. The method of claim 1, comprising determining, via the processor, a starting angle of the agricultural vehicle relative to the guidance swath, a starting speed of the agricultural vehicle, a starting distance of the agricultural vehicle from the guidance swath, or a combination thereof, wherein determining the path of the agricultural vehicle is based at least in part on the starting angle, the starting speed, the starting distance, or a combination thereof.

8. The method of claim 1, wherein determining the path of the agricultural vehicle comprises simulating movement of the agricultural vehicle using a guidance algorithm, and controlling the agricultural vehicle comprises controlling the agricultural vehicle using the guidance algorithm.

9. A control system for an agricultural vehicle, comprising:
   a user interface comprising a display, wherein the user interface is configured to output a first signal indicative of a value of at least one parameter; and
   a controller communicatively coupled to the user interface, wherein the controller is configured to determine a path of the agricultural vehicle toward a guidance swath based at least in part on the at least one parameter;
   wherein the controller is configured to output a second signal to the display indicative of instructions to display a graphical representation of the path, and the controller is configured to control the agricultural vehicle based at least in part on the at least one parameter upon receiving at least a third signal from the user interface indicative of acceptance of the value of the at least one parameter.

10. The control system of claim 9, wherein the at least one parameter comprises an initial turn rate of the agricultural vehicle, an approach angle of the agricultural vehicle toward the guidance swath, a swath turn rate of the agricultural vehicle, an overshoot of the guidance swath, or a combination thereof.

11. The control system of claim 9, wherein the controller is configured to output a fourth signal to the display indicative of instructions to present a visual representation of the value of the at least one parameter.

12. The control system of claim 9, wherein the controller is configured to output a fifth signal to the display indicative of instructions to present a graphical representation of the guidance swath.

13. The control system of claim 9, wherein the controller is configured to determine a path of an agricultural implement coupled to the agricultural vehicle based at least in part on the path of the agricultural vehicle, and the controller is configured to output a sixth signal to the display indicative of instructions to present a graphical representation of the path of the agricultural implement.

14. The control system of claim 9, wherein the user interface is configured to output a seventh signal indicative of a starting angle of the agricultural vehicle relative to the guidance swath, a starting speed of the agricultural vehicle, a starting distance of the agricultural vehicle from the guidance swath, or a combination thereof, and the controller is configured to determine the path of the agricultural vehicle toward the guidance swath based at least in part on the starting angle, the starting speed, the starting distance, or a combination thereof.

15. The control system of claim 9, wherein the controller is configured to determine a starting angle of the agricultural vehicle relative to the guidance swath, a starting speed of the agricultural vehicle, a starting distance of the agricultural vehicle from the guidance swath, or a combination thereof, and the controller is configured to determine the path of the agricultural vehicle toward the guidance swath based at least in part on the starting angle, the starting speed, the starting distance, or a combination thereof.

16. The control system of claim 9, wherein the controller is configured to determine the path of the agricultural vehicle by simulating movement of the agricultural vehicle using a guidance algorithm, and the controller is configured to control the agricultural vehicle using the guidance algorithm.

17. An apparatus comprising:
at least one non-transitory, tangible, machine-readable media having instructions encoded thereon for execution by a processor, the instructions comprising:
instructions to receive a first signal from a user interface indicative of a value of at least one parameter;
instructions to determine a path of an agricultural vehicle toward a guidance swath based at least in part on the at least one parameter;
instructions to output a second signal to a display of the user interface indicative of instructions to display a graphical representation of the path of the agricultural vehicle; and
instructions to control the agricultural vehicle based at least in part on the at least one parameter upon receiving at least a third signal from the user interface indicative of acceptance of the value of the at least one parameter.

18. The apparatus of claim 17, wherein the at least one parameter comprises an initial turn rate of the agricultural vehicle, an approach angle of the agricultural vehicle toward the guidance swath, a swath turn rate of the agricultural vehicle, an overshoot of the guidance swath, or a combination thereof.

19. The apparatus of claim 17, wherein the instructions comprise:
instructions to determine a path of an agricultural implement coupled to the agricultural vehicle based at least in part on the path of the agricultural vehicle; and
instructions to output a fourth signal to the display indicative of instructions to present a graphical representation of the path of the agricultural implement.

20. The apparatus of claim 17, wherein the instructions to determine the path of the agricultural vehicle comprise instructions to simulate movement of the agricultural vehicle using a guidance algorithm, and the instructions to control the agricultural vehicle comprise instructions to control the agricultural vehicle using the guidance algorithm.

* * * * *